United States Patent
Morris

(10) Patent No.: US 7,320,599 B2
(45) Date of Patent: Jan. 22, 2008

(54) BLOOD PRESSURE SIMULATION APPARATUS WITH TACTILE INTERFACE

(76) Inventor: Gary Jay Morris, 2026 Glenmark Ave., Morgantown, WV (US) 36505-2900

( * ) Notice: Subject to any disclaimer, the term of this patent is extended or adjusted under 35 U.S.C. 154(b) by 475 days.

(21) Appl. No.: 10/677,668

(22) Filed: Oct. 2, 2003

(65) Prior Publication Data

US 2005/0074732 A1 Apr. 7, 2005

(51) Int. Cl.
G09B 23/28 (2006.01)
(52) U.S. Cl. ........................ 434/262; 434/268
(58) Field of Classification Search ............ 434/268, 434/262, 265, 266, 272, 275, 267; 600/490, 600/493
See application file for complete search history.

(56) References Cited

U.S. PATENT DOCUMENTS

| | | | |
|---|---|---|---|
| 2,556,043 A * | 6/1951 | Roucka | 434/268 |
| 2,871,584 A * | 2/1959 | Poole | 434/268 |
| 2,995,832 A * | 8/1961 | Alderson | 434/268 |
| 3,784,323 A * | 1/1974 | Sausse | 417/53 |
| 3,868,844 A | 3/1975 | Klein | |
| 3,947,974 A * | 4/1976 | Gordon et al. | 434/266 |
| 3,975,989 A * | 8/1976 | Hirmann | 92/48 |
| RE29,317 E * | 7/1977 | Mosley et al. | 73/866.4 |
| 4,036,216 A * | 7/1977 | Ramsey, III | 600/488 |
| 4,090,431 A * | 5/1978 | Hirmann | 92/92 |
| 4,124,023 A * | 11/1978 | Fleischmann et al. | 600/436 |
| 4,167,070 A * | 9/1979 | Orden | 434/272 |
| 4,189,936 A | 2/1980 | Ellis | |
| 4,248,241 A * | 2/1981 | Tacchi | 600/484 |
| 4,281,647 A * | 8/1981 | Antypas | 602/21 |
| 4,360,345 A * | 11/1982 | Hon | 434/262 |
| 4,464,123 A | 8/1984 | Glover et al. | |
| 4,471,646 A | 9/1984 | Walker | |
| 4,524,777 A * | 6/1985 | Kisioka et al. | 600/490 |
| 4,569,221 A | 2/1986 | Snook | |
| 4,574,812 A * | 3/1986 | Arkans | 600/504 |
| 4,601,665 A * | 7/1986 | Messmore | 434/267 |
| 4,613,327 A * | 9/1986 | Tegrarian et al. | 604/141 |
| 4,648,406 A * | 3/1987 | Miller | 600/487 |
| 4,658,829 A | 4/1987 | Wallace | |
| 4,698,997 A | 10/1987 | Hess et al. | |
| 4,773,865 A * | 9/1988 | Baldwin | 434/268 |
| 4,841,956 A * | 6/1989 | Gardner et al. | 601/152 |

(Continued)

OTHER PUBLICATIONS

Life Form Deluxe Blood Pressure Simulator with Speaker System, brochure from Global Technologies, date accessed Sep. 22, 2003, www.global-technologies.net/ShopSite/product691.html.

(Continued)

*Primary Examiner*—Ronald Laneau
*Assistant Examiner*—Nikolai A Gishnock
(74) *Attorney, Agent, or Firm*—Gary J. Morris

(57) ABSTRACT

The blood pressure level in humans is a vital health parameter, yet the vast majority of people do not have a physical feeling for what normal and abnormal blood pressure levels mean in relation to the forces exerted on the heart and blood vessels. A blood pressure simulation apparatus is described which provides human subjects a means to physically feel simulated blood pressure levels through a tactile interface. Both normal and abnormal blood pressure cycles are simulated. Interfacing of the apparatus to an electronic blood pressure monitor is provided.

3 Claims, 2 Drawing Sheets

U.S. PATENT DOCUMENTS

| | | | | |
|---|---|---|---|---|
| 4,846,160 | A * | 7/1989 | Gardner et al. | 601/152 |
| 5,005,826 | A * | 4/1991 | Merrick | 482/10 |
| 5,016,466 | A | 5/1991 | Ness et al. | |
| 5,027,641 | A | 7/1991 | Costello | |
| 5,041,973 | A * | 8/1991 | Lebron et al. | 703/11 |
| 5,090,417 | A * | 2/1992 | Mollan et al. | 600/504 |
| 5,181,522 | A * | 1/1993 | McEwen | 600/561 |
| 5,201,320 | A * | 4/1993 | Barker | 600/493 |
| 5,215,469 | A * | 6/1993 | Kohnke et al. | 434/268 |
| 5,267,923 | A * | 12/1993 | Piaget et al. | 482/53 |
| 5,277,187 | A | 1/1994 | Pillsbury | |
| 5,374,194 | A * | 12/1994 | Walcerz et al. | 434/265 |
| 5,391,081 | A * | 2/1995 | Lampotang et al. | 434/262 |
| 5,391,141 | A * | 2/1995 | Hamilton | 601/151 |
| 5,396,895 | A * | 3/1995 | Takashima et al. | 600/500 |
| 5,452,727 | A * | 9/1995 | Tura et al. | 600/590 |
| 5,464,017 | A * | 11/1995 | Juang | 600/485 |
| 5,467,772 | A * | 11/1995 | Souma | 600/493 |
| 5,505,701 | A * | 4/1996 | Anaya Fernandez de Lomana | 604/101.03 |
| 5,531,668 | A * | 7/1996 | Mann et al. | 602/13 |
| 5,553,503 | A * | 9/1996 | Surdut et al. | 73/778 |
| 5,632,623 | A * | 5/1997 | Kolff et al. | 434/272 |
| 5,643,138 | A * | 7/1997 | Huang | 482/4 |
| 5,671,751 | A * | 9/1997 | Tumey et al. | 600/493 |
| 5,681,043 | A * | 10/1997 | Winblad et al. | 273/317.3 |
| 5,722,413 | A * | 3/1998 | Futcher et al. | 600/481 |
| 5,775,916 | A * | 7/1998 | Cooper et al. | 434/267 |
| 5,800,359 | A | 9/1998 | Medero et al. | |
| 5,839,904 | A * | 11/1998 | Bloom | 434/268 |
| 5,873,731 | A * | 2/1999 | Prendergast | 434/262 |
| 5,882,207 | A * | 3/1999 | Lampotang et al. | 434/268 |
| 5,991,654 | A * | 11/1999 | Tumey et al. | 600/479 |
| 6,007,342 | A * | 12/1999 | Tj.o slashed.lsen | 434/265 |
| 6,017,307 | A * | 1/2000 | Raines | 600/300 |
| 6,086,516 | A * | 7/2000 | Santos | 482/5 |
| 6,149,587 | A * | 11/2000 | Raines | 600/300 |
| 6,162,188 | A * | 12/2000 | Barnea | 600/587 |
| 6,168,567 | B1 * | 1/2001 | Pickering et al. | 600/490 |
| 6,205,871 | B1 * | 3/2001 | Saloner et al. | 73/866.4 |
| 6,251,080 | B1 * | 6/2001 | Henkin et al. | 600/490 |
| 6,283,763 | B1 * | 9/2001 | Matsuzaki et al. | 434/262 |
| 6,517,354 | B1 * | 2/2003 | Levy | 434/262 |
| 6,606,907 | B1 * | 8/2003 | Rosendahl | 73/379.01 |
| 6,669,624 | B2 * | 12/2003 | Frazier | 600/18 |
| 6,725,728 | B1 * | 4/2004 | Lee | 73/824 |
| 6,746,470 | B2 * | 6/2004 | McEwen et al. | 606/202 |
| 6,790,043 | B2 * | 9/2004 | Aboud | 434/268 |
| 6,834,647 | B2 | 12/2004 | Blair et al. | |
| 6,918,862 | B1 * | 7/2005 | Comeau | 482/111 |
| 7,018,327 | B1 * | 3/2006 | Conti | 600/16 |
| 7,021,940 | B2 * | 4/2006 | Morris et al. | 434/268 |
| 2001/0043847 | A1 * | 11/2001 | Kramer | 414/5 |
| 2002/0061503 | A1 * | 5/2002 | Chamberlain | 434/267 |
| 2002/0117173 | A1 * | 8/2002 | Lynn et al. | 128/202.28 |
| 2003/0031993 | A1 * | 2/2003 | Pugh | 434/262 |
| 2003/0091968 | A1 * | 5/2003 | Eggert et al. | 434/262 |
| 2003/0139766 | A1 * | 7/2003 | McEwen et al. | 606/203 |
| 2004/0033477 | A1 * | 2/2004 | Ramphal et al. | 434/272 |
| 2005/0113652 | A1 * | 5/2005 | Stark et al. | 600/300 |

OTHER PUBLICATIONS

QA-1290 Non-invasive Blood Pressure Analyzer, brochure from Metron, date accessed Sep. 22, 2003, www.metron-biomed.com/product_sheets/qa1290_datasheet.htm.

Clinical Dynamics SmartArm NIBP Simulator, brochure from BC Group International, Inc., date accessed Sep. 22, 2003, www.testequipmentandtools.com/acatalog/index.html.

K.K. Deepak, "Blood Pressure Simulation Model: A Teaching Aid", Indian Journal of Physiology and Pharmacology, 1992, 36(3), pp. 155-161.

* cited by examiner

BLOOD PRESSURE SIMULATION APPARATUS WITH TACTILE INTERFACE

BACKGROUND FOR THE INVENTION

1. Field of Invention

This invention relates to a human blood pressure simulation apparatus that provides the user tactile sensations representing the level of pressure within his or her cardiovascular system during the cardiac cycle of pumping blood throughout the body. Both systolic and diastolic blood pressure levels are simulated at the pulse rate of the simulated cardiac output. The user may compare, by physical feel, his or her blood pressure cycle simulation with that of a normal blood pressure level simulation.

2. Background

Hypertension (high blood pressure) has been called "the silent killer" by health professionals since it damages the human body without being felt by the victim. It is well known that abnormal blood pressure levels can lead to many health related problems and even death. Many millions of people each year have their blood pressure measured, however, only very few actually know what the numbers mean physically with regards to the pressures experienced by their blood vessels and heart. Even less have a sense of what force is exerted by the heart on their blood vessels by normal and abnormal blood pressure levels. To increase the awareness of blood pressure levels in humans, an apparatus has been invented, as described herein, to provide physically sensible feedback in relation to the blood pressure cycle.

SUMMARY OF THE INVENTION

This invention provides tactile indications to human subjects related to blood pressure forces experienced by cardiovascular systems under normal and abnormal human blood pressure cycles. The instant invention permits human subjects to physically feel the cyclic pressure experienced by their heart or blood vessels by providing simulation of blood pressure cycles and by including a physical interface by which the subject can sense the force on his or her heart or blood vessels at both the systolic and diastolic portions of the simulated cardiac cycle.

Current medical literature cites normal blood pressure amplitudes for humans to be near 120 mm of Hg for the systolic phase and 80 mm of Hg for the diastolic phase relative to the atmospheric pressure. The units of "mm of Hg" refer to a mercury column (vertical manometer) supported by the blood pressure as measured by blood pressure measuring equipment such as a sphygmomanometer. The height of a vertical column of liquid is an accepted unit of pressure in scientific and medical literature. However, it is anticipated that very few people know what magnitudes of 120 mm of Hg, 80 mm of Hg, etc., actually mean in regard to pressure levels. To further complicate the issue, much of the time, the units on these pressure values are dropped for brevity and are simply reported as unitless numbers as "120/80" as the systolic pressure over the diastolic pressure.

Blood pressure is such a vital health parameter that it is extremely important that people have an accurate physical feeling for what their blood pressure level means relative to normal blood pressure. While customary reporting of systolic pressures over diastolic pressures is one way of relative abstract comparison with normal blood pressure levels, the experience of physically feeling what normal and abnormal blood pressure cycles are like is quite dramatic and has much more lasting impact on the subject. A subject actually feeling his or her abnormal blood pressure level through the apparatus of the instant invention may be more likely to comply with prescribed therapies such as taking medications, engaging in physical exercise, dieting, reduction of body mass, etc. in order to achieve normal blood pressure levels. It is well known that humans cannot feel the level of their arterial blood pressure by pressing their fingers against their veins or arteries near the surface of their skin.

In accordance with the invention, a sense of physical feel as a pressure magnitude comparison is provided rather than an abstract mental comparison of numerical values representing blood pressure levels. A pressurized fluid containing vessel with an interface which permits human subjects to receive tactile sensations of the pressure levels representing those experienced within the subject's blood vessels or heart is provided. It is understood that the use of the term "fluid" herein includes a gas or a liquid or both.

Various embodiments are described herein to simulate the parameters of the human blood pressure cycle and to convey those parameters to human subjects through the sense of touch.

DETAILED DESCRIPTION OF THE PREFERRED EMBODIMENT

Figure 1:
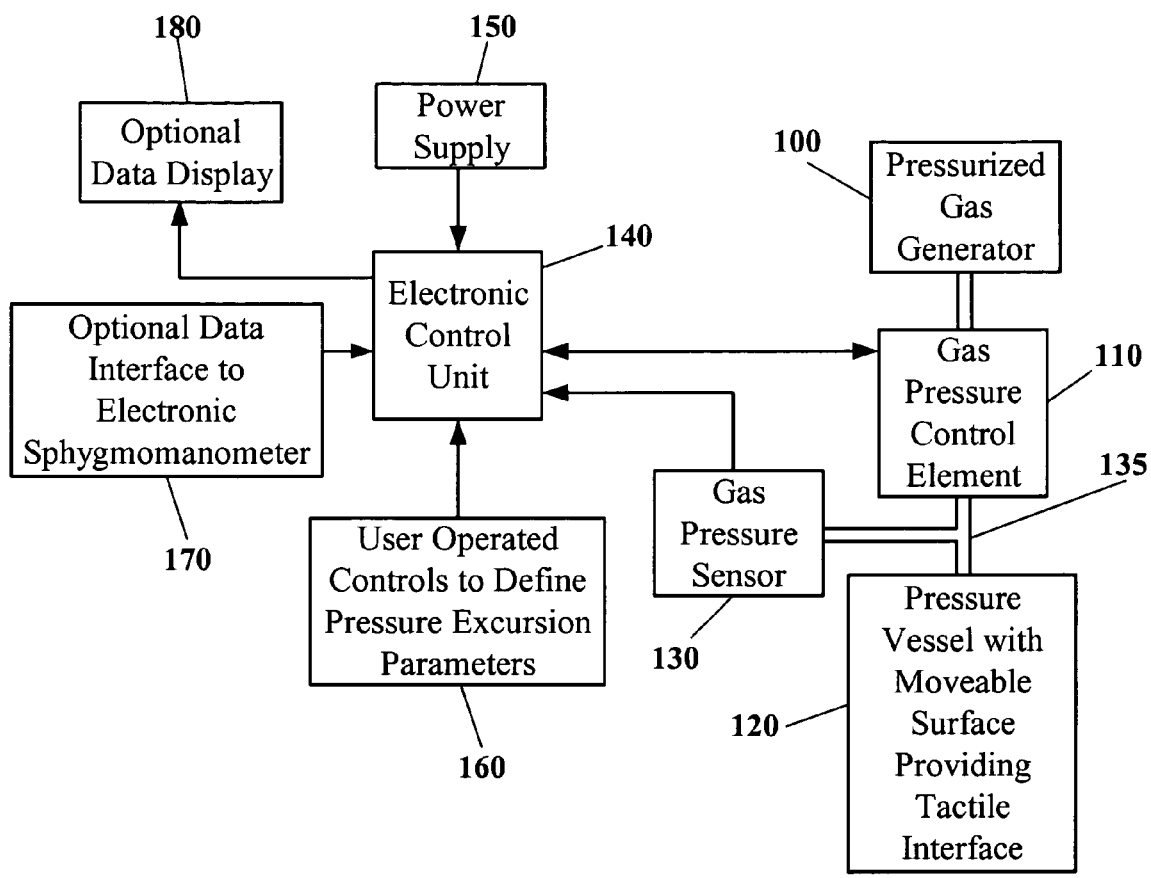
FIG. 1 is a block diagram of the electronic controlled embodiment of the Blood Pressure Simulation Apparatus with Tactile Interface.

One preferred embodiment of the Blood Pressure Simulation Apparatus with Tactile Interface is shown in FIG. 1. A pressurized fluid generator 100 provides a fluid above the ambient pressure to serve as the working medium within the pressure vessel with moveable surface providing tactile interface 120. The fluid is air in one embodiment. In another embodiment of the invention, the fluid is an incompressible liquid segregated from a gas to provide pressurization. The pressurized fluid generator 100 is an electric powered pump in one embodiment, a compressed fluid storage vessel in another embodiment, and a manually operated pump in yet another embodiment. A fluid pressure control element 110 serves as a pressure regulator to control the pressure level within the pressure vessel with moveable surface 120. A fluid pressure sensor 130 senses the pressure level within the pressure vessel with moveable surface 120 and provides pressure data feedback to the electronic control unit 140. A manifold 135 pneumatically connects the fluid pressure control element 110, the pressure vessel with moveable surface 120, and the fluid pressure sensor 130. A power supply 150 provides electrical energy to the electronic control unit 140. User-operated controls to define pressure excursion parameters 160 provide the user a preferred method to set the simulated diastolic blood pressure and systolic blood pressure levels within the pressure vessel with moveable surface 120 and to set the simulated cardiac pulse rate where, in one embodiment, these controls include electronic switches or variable resistors. In one embodiment, an optional data interface to an electronic sphygmomanometer 170 automatically transfers the human subject blood pressure data as input settings to the electronic control unit 140 to maintain the simulated diastolic and systolic blood pressure levels and the periodicity of the simulated cardiac cycle within the pressure vessel with moveable surface 120 to be equivalent to the respective pressure levels and cardiac cycle periodicity as measured from the subject by the electronic sphygmomanometer (not shown). An optional data display 180 is used in one embodiment to indicate to the user the simulated diastolic and systolic blood pressure levels. The electronic control unit 140 is the master controller unit of the apparatus interfacing with the fluid pressure sensor 130, the fluid pressure control element 110, the user operated controls 160, an optional data interface to the electronic sphygmomanometer 170, and the optional data display 180. The electronic control unit 140 electronically maintains the periodicity and pressure levels within the pressure vessel with moveable surface 120 for the simulated blood pressure cycles. In one embodiment, the electronic control unit 140 circuitry includes a microprocessor.

In one embodiment of the invention, the electronic control unit 140 interfaces with the fluid pressure control element 110 to maintain simulated diastolic and systolic blood pressure levels within the pressure vessel 120. In one embodiment of the invention, the fluid pressure control element 110 is an electromechanically actuated pressure regulator. In another embodiment of the invention, the fluid pressure control element 110 is an electric solenoid controlled valve system.

The pressure vessel with moveable surface 120 is the tactile interface with human subjects to physically communicate the pressure induced forces acting on blood vessels or heart subjected to blood pressure levels. The pressure level inside the pressure vessel with moveable surface 120 is communicated to a human subject through touching of at least one moveable surface. In one embodiment the pressure vessel with moveable surface 120 is comprised of a rubber or elastomeric hollow bulb (similar to the bulb 220 shown in FIG. 2) designed to be squeezed in one hand while a simulated blood pressure is applied to the bulb. In this embodiment, the user feels the force experienced by the walls of blood vessels or the heart under pressure and gets a true sense of the containment force required to maintain the blood vessels intact or the force the heart exerts to pump blood. In one embodiment, a small volume bulb can communicate the force exerted on the blood vessels while a larger volume bulb can communicate the force exerted by the heart. The forces due to abnormal blood pressure levels can be compared relative to forces due to normal blood pressure levels by adjusting the user-operated controls 160. In another embodiment, the rubber or elastomeric hollow bulb has a rigid, incompressible solid member positioned inside so that the human subject can compress the bulb by hand so at least some portion of the inner bulb surface remains in contact with the solid member, thus providing consistent feel and reduced tendency for the subject to randomly squeeze the bulb during blood pressure simulation. The incompressible member may further include at least one electrical contact to sense when the bulb has been squeezed to contact the incompressible member. In another embodiment, the pressure vessel with moveable surface 120 is comprised of a piston cylinder apparatus (not shown) whereby a human subject can feel the force on the piston induced by the simulated blood pressure levels. In yet another embodiment, an inflatable cuff serves as the tactile interface whereby a human body appendage such as a finger, hand, arm, or leg is surrounded by the cuff. In still yet another embodiment, an elastic walled, closed ended tube to simulate a blood vessel section serves as the tactile interface whereby a person can grip the tube to feel the force on the tube wall as an indication of the force exerted on a blood vessel wall due to a blood pressure cycle. All embodiments of the invention provide the user of the apparatus a physical feeling for the level of simulated blood pressure within the pressure vessel with moveable surface 120. The apparatus may simulate normal as well as abnormal human blood pressure levels.

In another preferred embodiment, the apparatus of FIG. 1 is integrally combined with an electronic sphygmomanometer to comprise a single unit capable of reading blood pressure levels and simulating the diastolic and systolic blood pressure levels so the human subject can physically feel the pressure induced forces experienced by the subject's own blood vessels.

Figure 2:
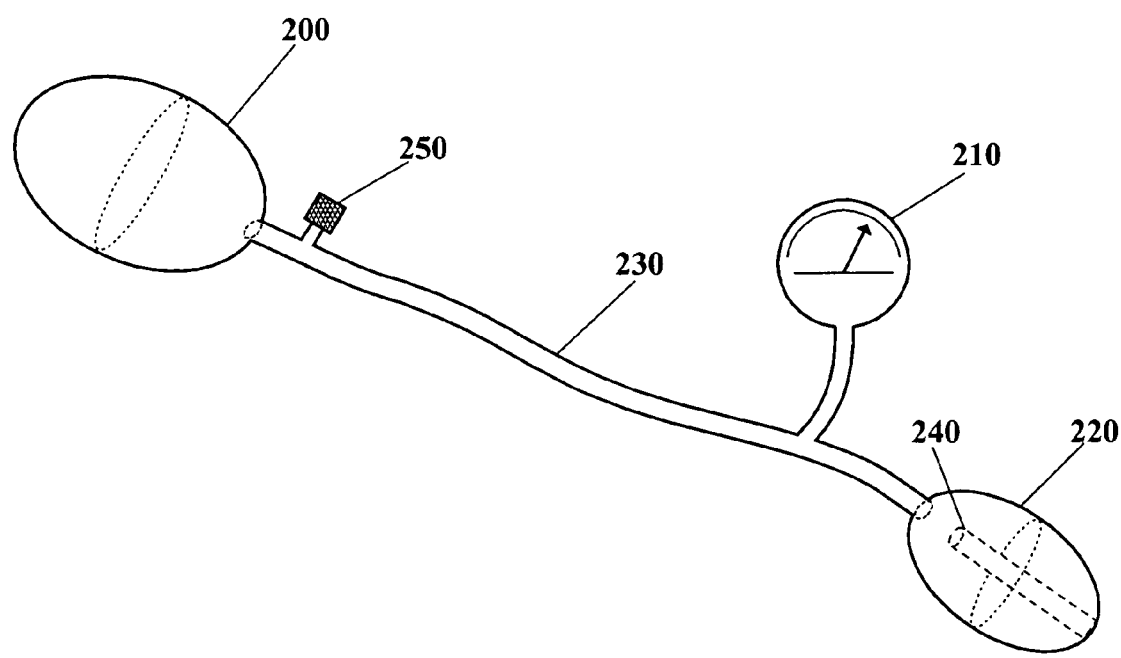
FIG. 2 is a drawing of the manually controlled embodiment of the Blood Pressure Simulation Apparatus with Tactile Interface.

Another preferred embodiment of the Blood Pressure Simulation Apparatus with Tactile Interface is shown in FIG. 2. The large volume elastomeric hollow bulb 200, the pressure indicator 210, the small volume elastomeric hollow bulb 220, and the connecting tubing 230 form a closed system. The terms "large" and "small" as used herein are relative terms only, and it is understood that the large volume elastomeric hollow bulb 200 contains as least as much volume as the small volume elastomeric hollow bulb 220. Both the large volume elastomeric hollow bulb 200 and the small elastomeric hollow bulb 220 may be held and compressed, at least partially, in a human hand. The user experiencing the blood pressure cycle simulation holds the small elastomeric hollow bulb 220 in one hand and squeezes the bulb to reduce the volume and to increase the fluid pressure indicated on the pressure indicator 210 to a level below the desired simulated diastolic blood pressure. In one embodiment as shown in FIG. 2, an incompressible member 240 is located within the small elastomeric hollow bulb 220 such that the user squeezes the bulb 220 so that the interior walls of the bulb 220 make contact with the incompressible member 240. A fluid bleed valve 250 is manually operated to reduce the mass of fluid in the closed system so the pressure as indicated by the pressure indicator 210 can be set below the desired simulated diastolic blood pressure. The user then alternately squeezes and partially releases the large elastomeric hollow bulb 200 with the other hand to simulate and manually control the diastolic and systolic blood pressure levels desired within the small elastomeric hollow bulb 220 as indicated on the pressure indicator 210. The user's hand continuing to grasp the small elastomeric hollow bulb 220 experiences force sensations indicative of the forces experienced by human blood vessel walls undergoing blood pressure cycles. Alternatively, a person other than the one experiencing the blood pressure simulation operates the large volume elastomeric hollow bulb 200 to drive and control the simulated blood pressure cycles. In one embodiment, the pressure indicator 210 is an electronic pressure sensor with digital display of pressure level. In another embodiment, the pressure indicator 210 is an analog pressure gage. In yet another embodiment, the pressure indicator 210 is a manometer.

It is understood that the concepts of the elastomeric hollow bulb described in this specification and appended claims are intended to be broad in scope and include all vessels having at least some non-fixed surface portion that can be used by humans to sense, through touch, pressure levels within such vessels. One function of the vessels with at least some non-fixed surface portion is to provide significant force amplification within the vessel compared to the force exerted on the walls of the relatively small diameter conduits comprising the manifold 135 and tubing 230 connecting the system components. The functions of elastomeric hollow bulbs described within this specification and appended claims may also be replaced with a bellows apparatus without loss of intended function of the invention.

The various preferred embodiments described above are merely descriptive of the present invention and are in no way intended to limit the scope of the invention. Modifications of the present invention will become obvious to those skilled in the art in light of the detailed description above, and such modifications are intended to fall within the scope of the appended claims.

I claim:

1. An apparatus for simulating human blood pressure and providing a tactile interface comprising:

an elastomeric hollow bulb;

an element to generate pressurized fluid outside of the elastomeric hollow bulb whereby pressure levels of the pressurized fluid are pneumatically conveyed to inside of the bulb through a conduit of smaller diameter than the bulb thereby resulting in force amplification within the bulb compared to within the conduit and;

a device to control the pressure levels within the bulb to simulate normal and abnormal human blood pressure levels within the bulb, whereby a human senses, through tactile contact with the bulb, the simulated normal and abnormal blood pressure levels within the bulb.

2. An apparatus for simulating human blood pressure and providing a tactile interface comprising:

a first elastomeric hollow bulb to pressurize fluid by manual compression of the bulb;

a second elastomeric hollow bulb pneumatically connected to the first elastomeric hollow bulb through a bi-directional flow conduit of smaller diameter than either the first or second bulb such that the pressure in the second bulb is controlled by the amount of manual compression of the first bulb and pressure induced forces are amplified within the bulbs compared to within the conduit;

the second elastomeric hollow bulb providing a tactile interface to a human subject whereby the human subject physically senses fluid pressure magnitudes internal to the second bulb by gripping the second bulb with at least one hand; and a visual indicator to display indicia which specifies pressure magnitudes within the second elastomeric hollow bulb.

3. The apparatus in claim 2 further comprising an incompressible, non-liquid member positioned within the second elastomeric hollow bulb such that substantial portions of the internal surfaces of the bulb are held in contact with the member.

* * * * *